United States Patent
Lumpkin et al.

(10) Patent No.: US 7,121,973 B2
(45) Date of Patent: Oct. 17, 2006

(54) METHODS AND APPARATUS FOR MINIMIZING BACKLASH IN A PLANETARY GEAR MECHANISM

(75) Inventors: Ted Lumpkin, Saugus, CA (US); Tom Wolf, Valencia, CA (US)

(73) Assignee: HR Textron, Inc., Santa Clara, CA (US)

( * ) Notice: Subject to any disclaimer, the term of this patent is extended or adjusted under 35 U.S.C. 154(b) by 163 days.

(21) Appl. No.: 10/839,091

(22) Filed: May 5, 2004

(65) Prior Publication Data

US 2005/0250614 A1 Nov. 10, 2005

(51) Int. Cl.
*F16H 3/74* (2006.01)
*F16H 57/08* (2006.01)

(52) U.S. Cl. .................................... 475/266; 475/349

(58) Field of Classification Search ................ 475/266, 475/331, 344, 349; 74/409, 457
See application file for complete search history.

(56) References Cited

U.S. PATENT DOCUMENTS

| | | | |
|---|---|---|---|
| 2,868,033 A | 1/1959 | Gaither | |
| 3,138,035 A | 6/1964 | Sivaslian | |
| 3,252,355 A * | 5/1966 | Hewko | 475/184 |
| 4,813,506 A * | 3/1989 | Smith | 180/6.44 |
| 4,827,786 A | 5/1989 | Bailey | 74/409 |
| 4,850,237 A * | 7/1989 | Hatayama et al. | 74/462 |
| 4,932,613 A | 6/1990 | Tiedeman et al. | 244/213 |
| 5,189,923 A | 3/1993 | Lashbrook | 74/409 |
| 5,240,462 A | 8/1993 | Mochizuki et al. | |
| 5,366,423 A | 11/1994 | Mori et al. | 475/346 |
| 5,409,430 A | 4/1995 | Hashimoto et al. | 475/331 |
| 5,518,466 A | 5/1996 | Tiedeman | 475/342 |
| 5,540,630 A | 7/1996 | Vranish | 475/338 |
| 5,679,089 A * | 10/1997 | Levedahl | 475/332 |
| 6,000,513 A | 12/1999 | Richards | 192/61 |
| 6,099,432 A | 8/2000 | Shirokoshi | 475/331 |
| 6,148,684 A | 11/2000 | Gardiner | 74/440 |
| 6,206,798 B1 * | 3/2001 | Johnson | 475/6 |
| 6,247,377 B1 | 6/2001 | Long et al. | 74/440 |
| 6,290,625 B1 | 9/2001 | Shirokoshi | 475/347 |
| 6,330,940 B1 * | 12/2001 | Spatafora | 198/594 |

(Continued)

FOREIGN PATENT DOCUMENTS

EP    0 826 902 A2    3/1998

(Continued)

OTHER PUBLICATIONS

Search Report from PCT/US2005/008120 filed on Nov. 3, 2005, Total p. 5.

*Primary Examiner*—Tisha Lewis
(74) *Attorney, Agent, or Firm*—BainwoodHuang

(57) ABSTRACT

A planetary gear system includes a planetary gear assembly having a first planetary gear, a second planetary gear rotatable relative to the first planetary gear, and a torquing mechanism. The torquing mechanism generates a torsional spring force of the planetary gear assembly to cause the first planetary gear to rotate along a first direction and the second planetary gear to rotate along a second direction, opposite to the first direction. As a result, the teeth of the first planetary gear contact teeth of a corresponding first stationary ring gear and the teeth of the second planetary gear contact teeth of a corresponding second stationary ring gear. The torquing mechanism, along with the configuration of the planetary gear assembly, minimizes or eliminates the presence of gaps between the contacting teeth of the planetary assembly and the stationary gear rings and minimizes backlash within the planetary gear system.

23 Claims, 4 Drawing Sheets

U.S. PATENT DOCUMENTS

| | | | |
|---|---|---|---|
| 6,344,009 B1 | 2/2002 | Wirz | 475/185 |
| 6,478,706 B1 * | 11/2002 | Crabb | 475/18 |
| 2002/0091030 A1 | 7/2002 | Haga et al. | 475/163 |
| 2003/0073537 A1 | 4/2003 | Lloyd | 475/331 |

FOREIGN PATENT DOCUMENTS

| | | |
|---|---|---|
| GB | 2 377 740 A | 1/2003 |
| JP | 02 129434 A | 8/1990 |

* cited by examiner

METHODS AND APPARATUS FOR MINIMIZING BACKLASH IN A PLANETARY GEAR MECHANISM

BACKGROUND

Conventional epicyclic gear trains, or planetary gear systems, include a central sun gear surrounded by one or more planetary gears. The planetary gears couple to a carrier via gear shafts or axes and mesh with an outer ring gear. During operation, for example, the sun gear provides an input rotation into the planetary gear system. In response to the rotational input, the planetary gears, and associated axes, rotate about the sun gear and, in turn, cause the outer ring gear to rotate.

Typically, manufacturers use epicyclic gear trains as part of actuation assemblies to control the movement of associated components. In the aerospace industry, for example, manufacturers utilize actuation assemblies to control the movement of aircraft wing flaps. One particular type of actuator used to control wing flap movement is a rotary actuator, such as the POWER HINGE manufactured by Curtiss-Wright. In aerospace applications, the rotary actuator functions as both a hinge that allows rotational movement of the wing flap relative to the wing of an aircraft and as an actuator that causes or creates motion of the wing flap relative to the wing.

SUMMARY

When two gears intermesh in an epicyclic gear train, such as an intermeshing between the teeth of the planetary gear and the teeth of the outer ring gear, the teeth along a face of the planetary gear do not necessarily align with the corresponding teeth of the outer ring gear. Standard clearances and manufacturing tolerances permit small variations in gear tooth size and pitch. Such variations, in turn cause the interacting surfaces of meshing gears to exhibit small gaps or spaces between their respective meshing teeth. The spaces can permit the entrance of a limited amount of slack or backlash into the system during operation of the epicyclic gear train.

For example, assume in an epicyclic gear train the teeth of a planetary gear and the teeth of an outer ring gear interlace such that the teeth of the planetary gear form gaps or spaces with the teeth of the outer ring gear. In such a configuration, when the epicyclic gear train sits in a resting state, the teeth of the planetary gear do not substantially contact the teeth of the outer ring gear. As the epicyclic gear train engages a rotating state from a resting state, because of the presence of the gaps between the teeth of the planetary gear and the ring gear, the planetary gear travels some distance before the teeth of the planetary gear contact or mesh with the teeth of the outer ring gear. Such travel is termed backlash and can create errors or inconsistencies in the relative positioning of the gears. In certain applications, such as actuation of a wing flap where accurate and steady movement is critical to an associated aircraft's response, a relatively small amount of backlash within the epicyclic gear train can create errors in accurate positioning of the wing flap and therefore affect the aircraft's response.

Furthermore, in the case where a manufacturer utilizes the epicyclic gear train in a vibrational environment, such as in aerospace applications, the presence of spaces or gaps between gears within the epicyclic gear train allows the vibrations to generate oscillations within the epicyclic gear train. In the case where the epicyclic gear train oscillates during operation, such oscillations can create errors or inconsistencies in the relative positioning of the gears.

By contrast, embodiments of the present invention significantly overcome the described deficiencies and provide mechanisms for minimizing backlash in a planetary gear system. A planetary gear system includes a planetary gear assembly having a first planetary gear, a second planetary gear rotatable relative to the first planetary gear, and a torquing mechanism. The torquing mechanism generates a torsional spring force of the planetary gear assembly to cause the first planetary gear to rotate along a first direction and the second planetary gear to rotate along a second direction, opposite to the first direction. As a result, the teeth of the first planetary gear contact teeth of a corresponding first stationary ring gear and the teeth of the second planetary gear contact teeth of a corresponding second stationary ring gear. The torquing mechanism, along with the configuration of the planetary gear assembly, minimizes the presence of gaps between the contacting teeth of the planetary assembly and the stationary gear rings and minimizes backlash within the planetary gear system.

In one arrangement, a planetary gear system has a planetary gear assembly including a first planetary gear and a second planetary gear, the first planetary gear rotatably coupled to the second planetary gear. The planetary gear system has a first stationary ring gear in communication with the first planetary gear, a second stationary ring gear in communication with the second planetary gear, and a torquing mechanism coupled to the planetary gear assembly. The torquing mechanism is configured to rotate the first planetary gear along a first rotational direction to load the first planetary gear against the first stationary ring gear. The torquing mechanism is also configured to rotate the second planetary gear along a second rotational direction to load the second planetary gear against the second stationary ring gear, the second direction opposite to the first rotational direction. The torquing mechanism minimizes or eliminates the presence of gaps between the contacting teeth of the planetary assembly and the stationary gear rings and minimizes backlash within the planetary gear system.

In one arrangement, the planetary gear assembly includes a first planetary gear assembly, a second planetary gear assembly, a third planetary gear assembly, and a fourth planetary gear assembly. Each gear assembly couples with and orients about a sun gear of the planetary gear system such that the first planetary gear assembly orients substantially opposite to the third planetary gear assembly relative to a long axis defined by the planetary gear system and such that second planetary gear assembly orients substantially opposite to the fourth planetary gear assembly relative to the long axis defined by the planetary gear system. In one arrangement, the torquing mechanism of each planetary gear assembly is configured to apply a torque to each planetary gear assembly according to a clocking arrangement. By utilizing a particular clocking arrangement, the torquing mechanisms minimize backlash within the planetary gear system between output planetary gears associated with the planetary gear assemblies and a both a rotatable ring gear and the sun gear of the planetary gear system while minimizing angular offset or angular positioning of the rotatable ring gear as caused by the output planetary gear when the planetary gear system is configured in a resting or steady-state position.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Embodiments of the present invention provide mechanisms for minimizing backlash in a planetary gear system. A planetary gear system includes a planetary gear assembly having a first planetary gear, a second planetary gear rotatable relative to the first planetary gear, and a torquing mechanism. The torquing mechanism generates a torsional spring force of the planetary gear assembly to cause the first planetary gear to rotate along a first direction and the second planetary gear to rotate along a second direction, opposite to the first direction. As a result, the teeth of the first planetary gear contact teeth of a corresponding first stationary ring gear and the teeth of the second planetary gear contact teeth of a corresponding second stationary ring gear. The torquing mechanism, along with the configuration of the planetary gear assembly, minimizes or eliminates the presence of gaps between the contacting teeth of the planetary assembly and the stationary gear rings and minimizes backlash within the planetary gear system.

Figure 1:
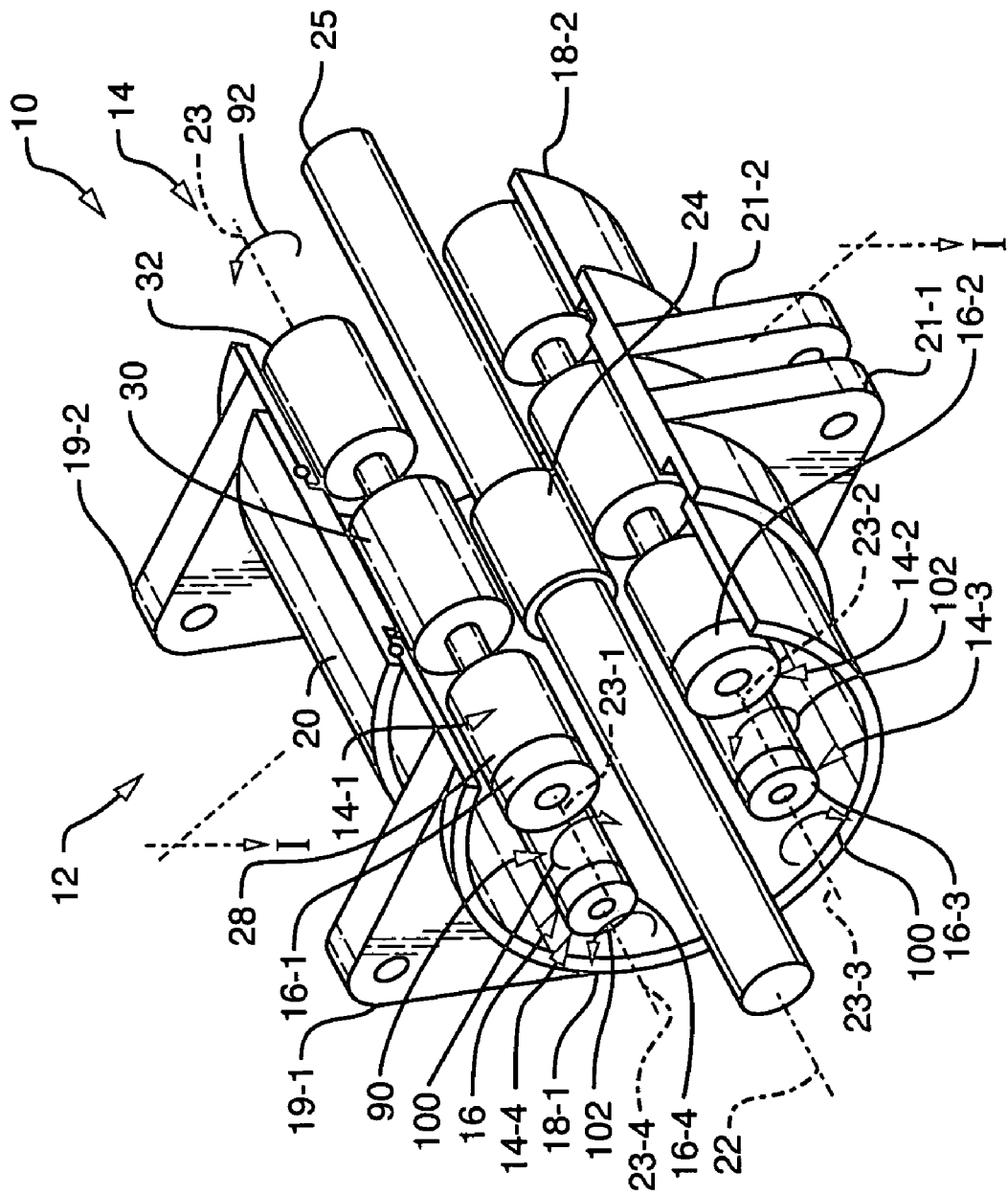
FIG. 1 shows a perspective view of a planetary gear system, according to one embodiment of the invention.
Figure 2:
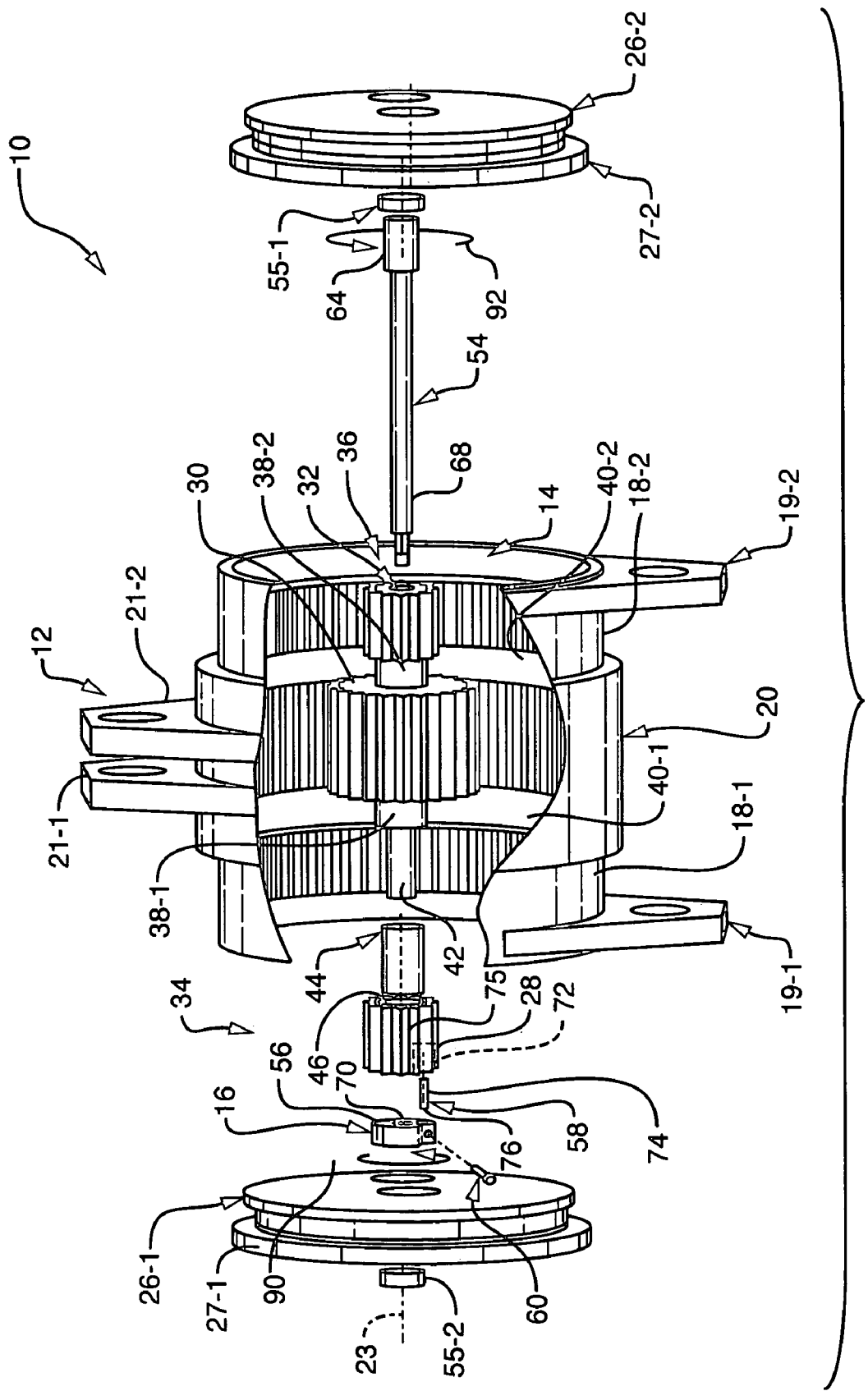
FIG. 2 illustrates an exploded assembly view of the planetary gear system of FIG. 1, according to one embodiment of the invention.
Figure 3:
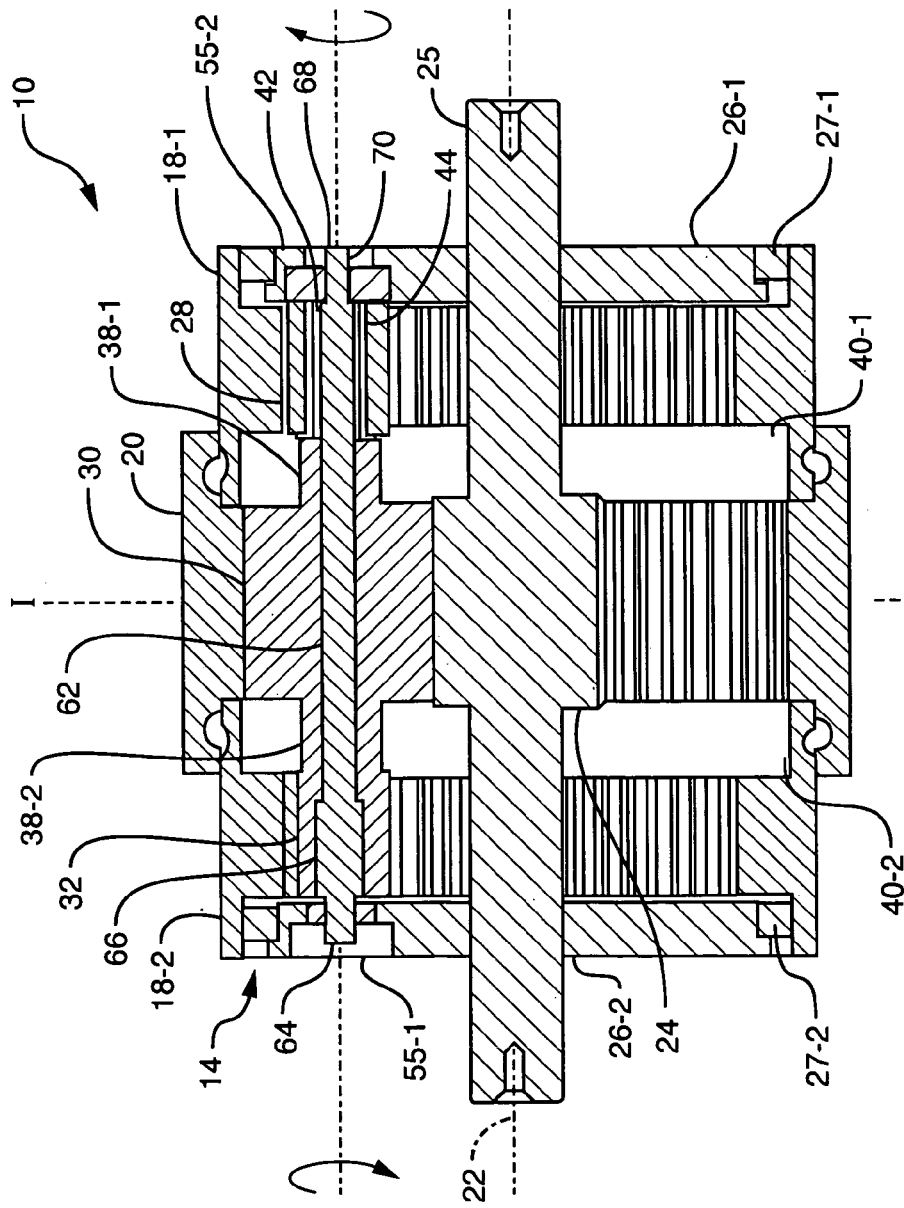
FIG. 3 shows a sectional view of the planetary gear system of FIG. 1, according to one embodiment of the invention.

FIGS. 1–3 illustrate an arrangement of a planetary gear system 10, such as a rotary actuator. FIG. 1 shows a perspective view of the system 10, FIG. 2 illustrates an exploded assembly view of the system 10, and FIG. 3 shows a sectional view of the planetary gear system 10 taken along line I—I. The planetary gear system 10 includes a ring gear assembly 12, a planetary gear assembly 14, a sun gear 24, and a torquing mechanism 16.

The ring gear assembly 12 of the planetary gear system 10 has a first stationary ring gear 18-1, a second stationary ring gear 18-2, and a rotatable ring gear (e.g. positional gear) 20. The first stationary ring gear 18-1 has a first mounting bracket 19-1 and the second stationary ring gear 18-2 has a second mounting bracket 19-2. The brackets 19-1, 19-2 are configured to couple the stationary ring gears 18-1, 18-2 to a securing object, such as an object having a relatively large mass. As such, the stationary ring gears 18-1, 18-2 are stationary (e.g., undergo minimal movement) relative to the securing object and are stationary relative to each other. The rotatable ring gear 20 includes brackets 21-1, 21-2 that are configured to couple to an actuatable object, such as a wing flap. The rotatable ring gear 20 is configured to rotate, relative to the stationary ring gears 18-1, 18-2, about a central axis 22 of the planetary gear system 10 to position the actuatable object about and relative to the central axis 22. The ring gear assembly 12, together with a first plate 26-1 having an associated plate bearing 27-1 and a second plate 26-2 having an associated bearing 27-2, form a housing for the planetary gear assemblies 14, as shown in FIGS. 2 and 3.

The planetary gear assembly 14 has a first planetary gear 28, an output gear or output planetary gear 30, and a second planetary gear 32. The planetary gear assembly 14 couples to the ring gear assembly 12 such that the first planetary gear 28 meshes with the first stationary ring gear 18-1, the second planetary gear 32 meshes with the second stationary ring gear 18-2, and the output planetary gear 30 meshes with the rotatable ring gear 20. In one arrangement, the planetary gear assembly 14 includes a first neck portion 38-1 oriented between the first planetary gear 32 and the output planetary gear 30 and a second neck portion 38-2 oriented between the output planetary gear 30 and the second planetary gear 32. The first neck portion 38-1 aligns with a clearance surface 40-1 of the first stationary ring gear 18-1 and the second neck portion 38-2 aligns with a clearance surface 40-2 of the second stationary ring gear 18-2.

As illustrated in FIGS. 2 and 3, the planetary gear assembly 14 is configured as two separate, but interconnected, elements. In one arrangement, the first planetary gear 28 defines a first assembly element 34 and an integrally formed second planetary gear 32, second neck portion 38-2, output planetary gear 30 and first neck portion 38-1 define a second assembly element 36. The second assembly element 36 includes an extension portion 42 integrally formed with the first neck portion 38-1. The first assembly element 34 couples to the second assembly element 36 via a journal bearing 44. The journal bearing 44 is configured as a sleeve that secures to the extension portion 42 and inserts within an opening 46 defined by the first planetary gear 28 second assembly element 36 and allows rotation of the first planetary gear 28 about a long axis 23 of the planetary gear assembly 14 and relative to the output planetary gear 30 and the second planetary gear 32.

As shown by FIGS. 1 and 3, the planetary gear system 10 also includes the sun gear 24. In one arrangement, multiple planetary gear assemblies 14 surround the sun gear 24 such that the output planetary gear 30 associated with each planetary gear assembly 14 meshes with the sun gear 24. The sun gear 24 couples, via a sun gear shaft 25, to a rotational input device, such as a motor. During operation of the rotational input device, the sun gear 24 receives, via the sun gear shaft 25, rotational input from the rotational input device and transmits the rotational input into the planetary gear system 10 to actuate the rotatable ring gear 20.

Figure 4:
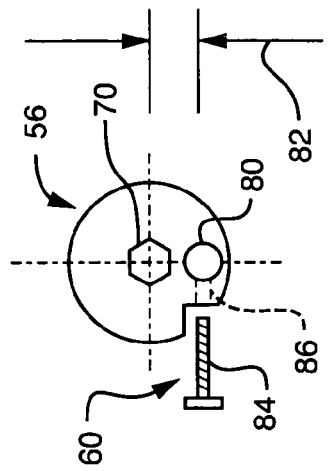
FIG. 4 illustrates a torque adaptor used in conjunction with the planetary gear system of FIG. 1, according to one embodiment of the invention.

FIGS. 2 and 3 illustrate a configuration of the torquing mechanism 16. The torquing mechanism 16 is configured to minimize backlash among the gears within the planetary gear system 10. In one arrangement, the torquing mechanism 16 includes a torsion bar 54, a torque adaptor 56, a fastener 58, and a torque adjuster 60. FIG. 4 illustrates a top view of the torque adaptor 56 and the torque adjuster 60 of the torquing mechanism 16.

As shown in FIGS. 2 and 3, the torsion bar 54 is configured to insert within a bore 62 defined by the planetary gear assembly 14. The torsion bar 54 has a first end 64 configured to engage an opening 66 defined by the second planetary gear 32 and has a second end 68 configured to engage an opening 70 defined by the torque adaptor 56.

In one arrangement, the first end 64 of the torsion bar 54 is configured in a multifaceted arrangement and the opening 66 defined by the second planetary gear 32 is configured in a corresponding multifaceted arrangement. For example, the first end 64 has a substantially hexagonal shape and the opening 66 defined by the second planetary gear 32 has a corresponding substantially hexagonal shape. Engagement of the first end 64 of the torsion bar 54 and the opening 66 defined by the second planetary gear 32 secures the first end 64 of the torsion bar 54 to the second planetary gear 32. The substantially hexagonal shape of the first end 64 of the torsion bar 54 and the opening 66 defined by the second planetary gear 32 minimizes slippage between the torsion bar 54 and the secondary planet gear 32 when the torquing mechanism 16 generates a torque on the planetary gear assembly 14.

As shown in FIGS. 2–4, in one arrangement, the second end 68 of the torsion bar 54 is configured in a multifaceted arrangement and the opening 70 defined by the torque adaptor 56 is configured in a corresponding multifaceted arrangement. For example, the second end 68 has a substantially hexagonal shape and the opening 70 defined by the torque adaptor 56 has a corresponding substantially hexagonal shape. Engagement of the second end 68 of the torsion bar 54 and the opening 70 defined by the torque adaptor 56 secures the second end 69 of the torsion bar 54 to the torque adaptor 56. The substantially hexagonal shape of the second end 68 of the torsion bar 54 and opening 70 defined by the torque adaptor 56 minimizes slippage between the torsion bar 54 and the torque adaptor 56 when the torquing mechanism 16 generates a torque on the planetary gear assembly 14.

Additionally, during assembly, the first end 64 of the torsion bar 54 couples to a first bearing support 55-1 and the second end 68 of the torsion bar 54 couples to a second bearing support 55-2. The first and second bearing supports 55-1, 55-2 are configured to limit separation of the first assembly element 34 (e.g., the first planetary gear 28) from the second assembly element 36.

The fastener 58 couples the torque adaptor 56 to the first planetary gear 28. In one arrangement, a first end 74 of the fastener 58 inserts within a bore 72 defined by the such that a long axis 75 of the fastener 58 is substantially parallel to, and offset from, the long axis 23 of the planetary gear assembly 14. Additionally, a second end 76 of the fastener 58 inserts within an opening 80 defined by the torque adaptor 56. As illustrated in FIG. 4, the opening 80 for the fastener 58 orients at a distance 82 from the opening 70 for the second end 68 of the torsion bar 54.

The torque adaptor 56 is configured to generate a torque on the planetary gear assembly 14 between the first planetary gear 28 and the second planetary gear 32. The torque adaptor 56 includes the torque adjuster 60 configured to provide an adjustable torque on the first planetary gear 28. For example, as illustrated by FIG. 4, in one arrangement, the torque adjuster 60 is configured as a set screw 84, such as a hex head screw that couples to the torque adaptor 56 via a threaded opening 86 defined by the torque adaptor 56. The threaded opening 86 aligns with the opening 80 defined by the torque adaptor 56 and orients substantially perpendicular to the opening 80. In such a configuration, the set screw 84 contacts the second end 76 of the fastener 58 as the set screw 84 engages the threads of the threaded opening 86 and provides an adjustable or variable amount of torque on the first planetary gear 28.

Returning to FIG. 1, during operation, the torquing mechanism 16 rotates the first planetary gear 28 along a first rotational direction 90 to load the first planetary gear 28 against the first stationary ring gear 18-1. Also during operation, the torquing mechanism 16 rotates the second planetary gear 32 along a second rotational direction 92, opposite to the first rotational direction 90, to load the second planetary gear 32 against the second stationary ring gear 18-2. Such torsion of the planetary gear assembly 14 minimizes or eliminates backlash within the planetary gear system 10 between the planetary gear assembly 14 and the stationary ring gears 18-1, 18-2.

For example, in the configuration of the planetary gear system illustrated in FIG. 2, assume an assembler rotates the torque adjuster 60 (e.g., the set screw 84) within the threaded opening 86 (e.g., shown in FIG. 4) of the torque adaptor 56. As the torque adjuster 60 contacts the fastener 58, the torque adaptor 60 generates a force on the fastener 58 and, as a result, causes the first planetary gear 28 to rotate in a clockwise direction about the extension portion 42 of the first assembly element 34. As a result, the teeth (e.g., a contact surface of the teeth) of the first planetary gear 28 mesh with or contact the teeth (e.g., mesh with a contact surface of the teeth) of the first stationary ring gear 18-1. Such contact minimizes the presence of spaces or gaps between the contacting surfaces of the first planetary gear teeth and the first stationary ring gear teeth.

Additionally, as the assembler continues to rotate the torque adjuster 60 within the threaded opening 86, the torque adjuster 60 generates a moment on the second end 68 of the torsion bar 54 across the distance 82 (e.g., as shown in FIG. 4) via the substantially hexagonally shaped interface between the torque adaptor 56 and the second end 68 of the torsion bar 54. Such a moment generates a torsional force on the second end 68 of the torsion bar 54. In response to the torsional force on the second end 68, the torsion bar 54 generates an equal and opposite force on the first end 64 of the torsion bar 54. As a result, the second planetary gear 32 rotates in a counterclockwise direction about the axis 23 such that the teeth (e.g., a contact surface of the teeth) of the second planetary gear 32 mesh with or contact the teeth (e.g., a contact surface of the teeth) of the second stationary ring gear 18-2. Such contact minimizes or eliminates the presence of spaces or gaps between the contacting surfaces of the second planetary gear teeth and the second stationary ring gear teeth.

By minimizing the presence of spaces between the contacting surfaces of the first planetary gear 28 and the first stationary ring gear 18-1 and between contacting surfaces of the second planetary gear 32 and the second stationary ring gear 18-2, the torquing mechanism 16 minimizes backlash within the planetary gear system 10. As such, the torquing mechanism 16 minimizes errors with respect to the relative positioning of the gears 28, 32, 18-1, 18-2 during operation of the planetary gear system 10.

As indicated above, in conventional planetary gear systems, gaps exist between the teeth of a planetary gear and a ring gear. As a planetary gear moves from a resting state to a rotating state, because of the presence of the gaps, the planetary gear travels some distance before the teeth of the planetary gear contact or mesh with the teeth of the outer ring gear. Such backlash creates errors in the relative positioning of the gears. In the present planetary gear system 10, the torquing mechanism 16 generates a torsional spring force on the planetary gear assembly 14. The torsional spring force minimizes or eliminates the presence of spaces between the teeth of first planetary gear 28 and the first stationary ring gear 18-1 and between the second planetary gear 32 and the second stationary ring gear 18-2. The torsional spring force also preload the planetary gear assembly 14 within the planetary gear system 10 to minimize compliance and increases the "stiffness" of the planetary gear system 10 (e.g., the torsional spring force "locks" the planetary gear assembly 14 within the system 10). By limiting the presence of spaces between the planetary gears 28, 32 and the stationary ring gears 18-1, 18-2 and by preloading the planetary gear assembly 14, the torquing mechanism 16 minimizes the presence of backlash within the planetary gear system 10, thereby minimizing errors with respect to the relative positioning of the gears 28, 32, 18-1, 18-2 during operation.

Also during operation, the torquing mechanism 16 generates a torsional spring force on the planetary gear assembly 14 that preloads the planetary gear assembly 14 and causes the planetary gears 28, 32 to rotate relative to each other in opposing directions. Such rotation causes the teeth of the first planetary gear 28 to abut the teeth of the first stationary ring gear 18-1 and causes the teeth of the second planetary gear 32 to abut the teeth of the second stationary ring gear 18-2. The stationary ring gears 18-1, 18-2 absorb and ground a substantial portion of the torsional spring force generated by the torquing mechanism 16, as transmitted through the planetary gears 28, 32. In such a configuration, interaction between the planetary gears 28, 32 and the stationary ring gears 18-1, 18-2 minimizes the amount of torsional spring force placed on the rotatable ring gear 20 as a result of the preload and minimizes rotation or movement of the rotatable ring gear 20. As such, interaction between the planetary gears 28, 32 and the stationary ring gears 18-1, 18-2, minimally affects the angular positioning of the rotatable ring gear (e.g., relative to the axis 22 of the planetary gear system 10) 20 when the planetary gear system engages a resting or steady-state position.

As described above, the torquing mechanism 16 aids in minimizing backlash between the planetary gears 28, 32 and the corresponding stationary ring gears 18-1, 18-2. The torquing mechanism 16 also aids in minimizing or eliminating backlash between the output planetary gear 30 and the rotatable ring gear 20 and between the output planetary gear 30 and the sun gear 24.

When the torquing mechanism 16 torques the planetary gear assembly 14, the torquing mechanism 16 generates a torsional spring force on the planetary gear assembly 14 that causes the secondary assembly element 36 (e.g., the ouput gear 30 and second planetary gear 32) to rotate in a direction opposing the input torque. Such rotation causes the teeth of the output planetary gear 30 to abut the teeth of the rotatable ring gear 20 and to abut the teeth of the sun gear 24, thereby providing contact between contacting surfaces of each output planetary gear 30 and both the rotatable ring gear 20 and the sun gear 24. Such contact minimizes backlash within the planetary gear system 10 between the output planetary gear 30 and both the rotatable ring gear 20 and the sun gear 24 of the planetary gear system 10.

When the teeth of the output planetary gear 30 abut the teeth of the rotatable ring gear 20, in a steady-state (e.g., resting) position, the output planetary gear 30 can transmit some amount of torsional spring force to the rotatable ring gear 20 and cause the rotatable ring gear 20 to rotate relative to the axis 22 of the planetary gear system 10. To minimize the rotation of the rotatable ring gear 20 as caused by the output gear 30, in one arrangement, the planetary gear system 10 has multiple sets of planetary gear assemblies 14 torqued within the planetary gear system 10 according to a particular clocking arrangement.

FIG. 1 illustrates, in one arrangement, the planetary gear system 10 as having four sets of planetary gear assemblies. For example, as illustrated, the planetary gear system 10 includes a first planetary gear assembly 14-1, a second planetary gear assembly 14-2, a third planetary gear assembly 14-3, and a fourth planetary gear assembly 14-4. Each of the planetary gear assemblies 14-1 through 14-4 has an associated output planetary gear 30 in communication with the sun gear 24. The planetary gear assemblies 14-1 and 14-3 orient about the sun gear 24 such that the first planetary gear assembly 14-1 substantially opposes (e.g., orients at approximately 180° opposite to) the third planetary gear assembly 14-3 relative to the long axis 22. The planetary gear assemblies 14-2 and 14-4 also orient about the sun gear 24 such that the second planetary gear assembly 14-2 substantially opposes (e.g., orients at approximately 180° opposite to) the third planetary gear assembly 14-4 relative to the long axis 22.

Each of the planetary gear assemblies 14-1 through 14-4 has a corresponding torquing mechanism 16-1 through 16-4. The torquing mechanisms 16-1 through 16-4 are configured to apply a torque to each corresponding planetary gear assembly 14-1 through 14-4 according to a clocking arrangement. By utilizing a particular clocking arrangement, the torquing mechanisms 16-1 through 16-4 minimize backlash within the planetary gear system 10 between the output planetary gears 30 and both the rotatable ring gear 20 and the sun gear 24 and minimize angular offset of the rotatable ring gear 20 as caused by the output planetary gear 30.

In one clocking arrangement, the torquing mechanism 16 sets the torque in each of the planetary gear assemblies 14 such that adjacent planetary gear assemblies 14-1 through 14-4 torque in opposing clocking directions (e.g., either clockwise or counterclockwise).

For example, assume the torquing mechanism 16-1 applies a torque to the first planetary gear assembly 14-1 along a first clocking direction 100, such as a clockwise clocking direction, about a first planetary gear axis 23-1 and relative to the axis 22 of the planetary gear system 10. In such a configuration, an assembler sets the torquing mechanism 16-2 of the adjacent second planetary gear assembly 14-2 and the torquing mechanism 16-4 of the adjacent fourth planetary gear assembly 14-4 to each apply a torque along a second clocking direction 102 opposite to the first clocking direction 100. As such, the torquing mechanism 16-2 of the second planetary gear assembly 14-2 applies a torque to the second planetary gear assembly 14-2 in a counterclockwise clocking direction 102 about a second planetary gear axis 23-1 and relative to the axis 22 of the planetary gear system 10. Additionally, the torquing mechanism 16-4 of the fourth planetary gear assembly 14-4 applies a torque to the fourth planetary gear assembly 14-4 in a counterclockwise clocking direction 102 about a fourth planetary gear axis 23-4 and relative to the axis 22 of the planetary gear system 10. The assembler sets the torquing mechanism 16-3 of the third planetary gear assembly 14-3 to apply a torque along the first clocking direction 100 (e.g., the clockwise clocking direction) on the third planetary gear assembly 14-3 about a third planetary gear axis 23-3 and relative to the axis 22 of the planetary gear system 10.

In such a clocking arrangement, the torquing mechanisms 16-1 through 16-4 cause the teeth of each output planetary gear 30 to mesh with both the rotatable ring gear 20 and the sun gear 24, thereby minimizing backlash within the planetary gear system 10. Additionally, in such a clocking arrangement, the torquing mechanisms 16-1 through 16-4 torque adjacent planetary gear assemblies (e.g., assemblies 14-1 and 14-2, assemblies 14-2 and 14-3, assemblies 14-3 and 14-4, and assemblies 14-4 and 14-1) along opposing clocking directions. In turn, the torquing mechanisms 16-1 through 16-4 cause adjacent output planetary gears 30 to apply opposing spring forces on the rotatable ring gear 20. As such, the opposing spring forces between adjacent output planetary gears 30 substantially balance each other, thereby minimizing the effect of the output planetary gear 30 (e.g., the spring load carried by the output planetary gear 30) on the angular position of the rotatable ring gear 20 relative to the axis 22 when the planetary gear system 10 is configured in a resting or steady-state position.

Conventional involute profile gear teeth are configured to receive and transmit relatively light or small loads during operation. As such, the gear teeth experience minimal deflection during operation (e.g., deflections of a few microns at a pitch line associated with the gear teeth). In certain cases, as the load on the teeth varies, the load can be large enough to produce relatively large tooth deflections (e.g., deflections on the order of tens of microns at the pitch line). Such relatively large tooth deflections can lead to binding of the gears.

With respect to the present planetary gear system 10, as indicated above, when a manufacturer assembles a planetary gear system 10, the manufacturer preloads a planetary gear assembly 14 within the planetary gear system to minimize backlash within the system 10. As such, when the teeth of the first planetary gear 28 mesh with the teeth of the first stationary ring gear 18-1, the teeth of the second planetary gear 32 mesh with the teeth of the second stationary gear 18-2, and the teeth of the output planetary gear 30 mesh with the teeth of the rotatable gear 20 and the teeth of the sun gear 24, all of the teeth of all of the gears are exposed to a substantially constant spring force or load. Assume the rotatable ring gear 20 couples to an actuatable object. During operation, when the sun gear 24 provides a rotational input into the planetary gear system 10 to actuate the rotatable ring gear 20, the teeth of the sun gear 24, the teeth of the output planetary gear 30 and the teeth of the rotatable ring gear 20 experience an additional (e.g., variable) load corresponding to the mass of the actuatable object, for example.

In order to minimize or correct for tooth deflection and binding of the gear teeth within the planetary gear system 10, a manufacturer adjusts the tooth profile of the gear teeth according to the type of load received by the teeth. For gears exposed to a substantially constant load, a manufacturer configures the teeth with a long tooth profile adjustment. Additionally, for gears exposed to a substantially variable load, a manufacturer configures the teeth with a short tooth profile adjustment. Additionally, for gears exposed to a both substantially fixed and variable load, a manufacturer configures the teeth with both a long and short tooth profile adjustment.

Figure 5A:
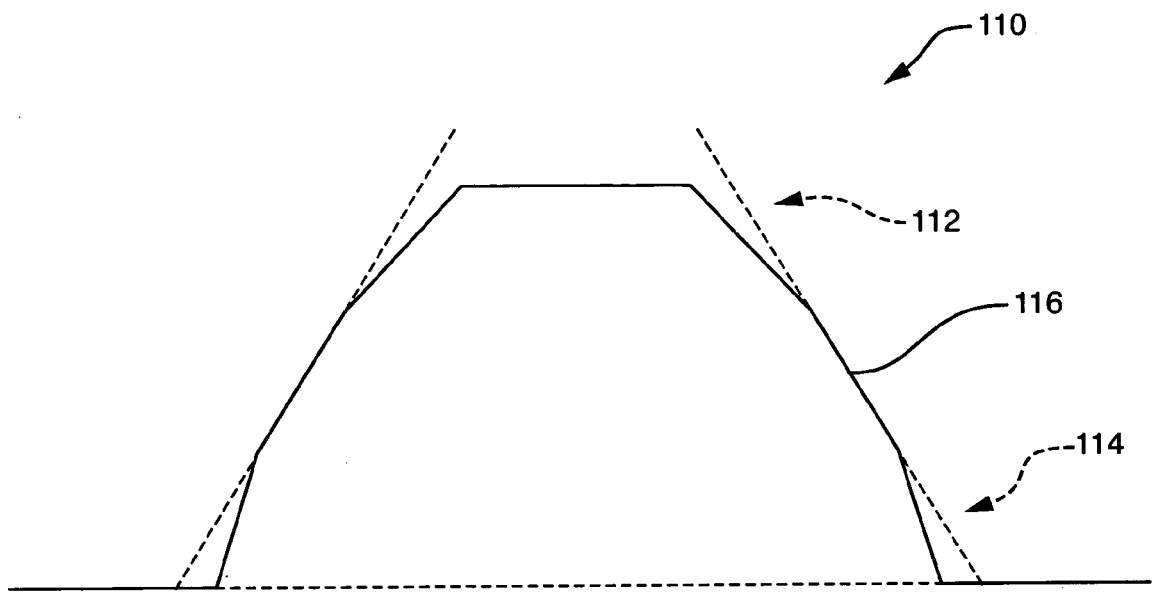
FIG. 5A illustrates an example of a long profile adjustment for a gear tooth, according to one embodiment of the invention.
Figure 5B:
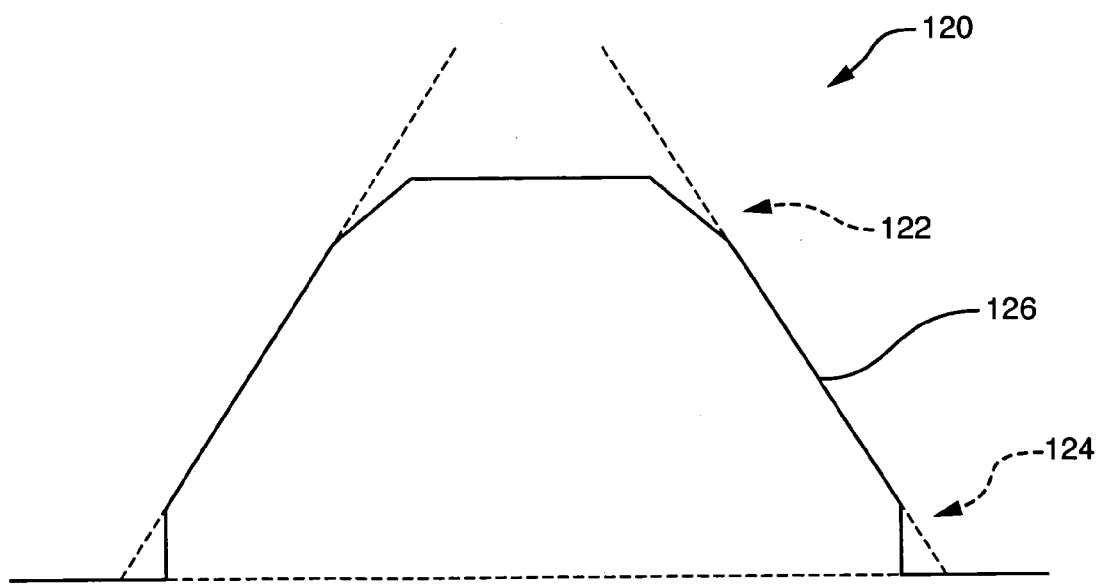
FIG. 5B illustrates an example of a short profile adjustment for a gear tooth, according to one embodiment of the invention.

FIG. 5A illustrates an example of a gear tooth 110 having a long tooth profile. FIG. 5B illustrates an example of a gear tooth 120 having a short tooth profile. The tooth 110 having the long tooth profile, as illustrated in FIG. 5A, includes a tip 112, a contact surface 116, and a root 114. The tooth 120 having the short tooth profile, as illustrated in FIG. 5B, includes a tip 122, a contact surface 126, and a root 124. In comparing FIG. 5A with 5B, the tip 122 of the tooth 120 having the short tooth profile contains more material than the tip 112 of the tooth 110 having the long tooth profile and the root 124 of the tooth 120 having the short tooth profile contains more material than the root 114 of the tooth 110 having the long tooth profile. Additionally, for relatively light and medium tooth load, the contact surface 126 of the tooth 120 having the short tooth profile is comparatively larger than contact surface 116 of the tooth 110 having the long tooth profile.

Because the tooth 120 having the short tooth profile includes a greater amount of material than the tooth 110 having the long tooth profile, the tooth 120 having the short tooth profile can withstand a greater amount of load (e.g., variable load) than the tooth 110 having the long tooth profile (e.g., and deflect by approximately the same amount as the tooth 110). In turn, a manufacturer configures gear teeth, within the planetary gear system 10, exposed to a variable load with the short tooth profile and configures gear teeth exposed to a relatively constant load with the long tooth profile. As such, for example, a manufacturer adjusts the tooth profile of the teeth of the rotatable ring gear 20, the sun gear 24, and the output planetary gear 30 with the short tooth profile. Additionally, the manufacturer adjusts the tooth profile of the teeth of the first planetary gear 28, the second planetary gear 32, the first stationary gear 18-1, and the second stationary gear 18-2 with the long tooth profile. Such adjustment minimizes binding of the gear teeth during the transition into tooth contact, (e.g., the transition between single tooth contact and multiple tooth contact or at the point where any additional or "new" teeth revolve into contact), due to tooth deflection of the already loaded teeth within the planetary gear system 10

While this invention has been particularly shown and described with references to preferred embodiments thereof, it will be understood by those skilled in the art that various changes in form and details may be made therein without departing from the spirit and scope of the invention as defined by the appended claims.

For example, FIG. 1 illustrates the planetary gear system 10 as having four planetary gear assemblies 14-1 through 14-4. Such illustration is by way of example only. In one arrangement, the planetary gear system 10 is configured with additional gear assemblies 14.

As indicated above, in one clocking arrangement, the torquing mechanism 16 sets the torque in each of the planetary gear assemblies 14 such that adjacent planetary gear assemblies 14-1 through 14-4 torque in opposing clocking directions (e.g., either clockwise or counterclockwise). Such description was by way of example only. In another clocking arrangement, the torquing mechanism 16 sets the torque in each of the planetary gear assemblies 14 such that opposing planetary gear assemblies 14-1 through 14-4 torque in opposing clocking directions (e.g., either clockwise or counterclockwise).

For example, in such a configuration, the torquing mechanism 16-1 applies a torque to the first planetary gear assembly 14-1 along a first clocking direction, such as a clockwise clocking direction, about the first planetary gear axis 23-1 and relative to the axis 22 of the planetary gear system 10. The torquing mechanism 16-2 applies a torque to the second planetary gear assembly 14-2 along the first clocking direction, such as the clockwise clocking direction, about the second planetary gear axis 23-2 and relative to the axis 22 of the planetary gear system 10. Also in the configuration, the torquing mechanism 16-3 of the third planetary gear assembly 14-3, opposing the first planetary gear assembly 14-1, applies a torque to the third planetary gear assembly 14-3 along a second clocking direction opposite to the first clocking direction. Additionally, the torquing mechanism 16-4 of the fourth planetary gear assembly 14-4, opposing the second planetary gear assembly 14-2, applies a torque to the fourth planetary gear assembly 14-4 along the second clocking direction (e.g., opposite to the first clocking direction).

In such a clocking arrangement, the torquing mechanisms 16-1 through 16-4 cause the teeth of each output planetary gear 30 to mesh with both the rotatable ring gear 20 and the sun gear 24, thereby minimizing backlash within the planetary gear system 10. Additionally, in such a clocking arrangement, the torquing mechanisms 16-1 through 16-4 torque opposing planetary gear assemblies (e.g., assemblies 14-1 and 14-2, assemblies 14-2 and 14-3, assemblies 14-3 and 14-4, and assemblies 14-4 and 14-1) along opposing clocking directions. In turn, the torquing mechanisms 16-1 through 16-4 cause opposing output planetary gears 30 to apply opposing spring forces on the rotatable ring gear 20. As such, the opposing spring forces between adjacent output planetary gears 30 substantially balance each other, thereby minimizing the effect of the output planetary gear 30 (e.g., the spring load carried by the output planetary gear 30) on the angular position of the rotatable ring gear 20 relative to the axis 22 when the planetary gear system 10 is configured in a resting or steady-state position.

What is claimed is:

1. A planetary gear system comprising:
   a planetary gear assembly having a first planetary gear and a second planetary gear, the first planetary gear rotatably coupled to the second planetary gear;
   a first stationary ring gear in communication with the first planetary gear;
   a second stationary ring gear in communication with the second planetary gear; and
   a torquing mechanism coupled to the planetary gear assembly, the torquing mechanism configured to (i) rotate the first planetary gear along a first rotational direction to load the first planetary gear against the first stationary ring gear and (ii) rotate the second planetary gear along a second rotational direction to load the second planetary gear against the second stationary ring gear, the second direction being substantially opposite to the first rotational direction.

2. The planetary gear system of claim 1 wherein the planetary gear assembly further comprises:
   an output planetary gear coupled to the second planetary gear;
   a sun gear in communication with at least one of the output planetary gear, the first planetary gear, and the second planetary gear; and
   a rotatable ring gear in communication with the output planetary gear, the rotatable ring gear configured to rotate relative to the first stationary ring gear and the second stationary ring gear.

3. The planetary gear system of claim 2 wherein the planetary gear assembly comprises a first planetary gear assembly, a second planetary gear assembly, a third planetary gear assembly, and a fourth planetary gear assembly, each gear assembly in communication with and oriented about the sun gear such that the first planetary gear assembly orients substantially opposite to the third planetary gear assembly relative to a long axis defined by the planetary gear system and such that the second planetary gear assembly orients substantially opposite to the fourth planetary gear assembly relative to the long axis defined by the planetary gear system.

4. The planetary gear system of claim 3 wherein the torquing mechanism of each planetary gear assembly is configured to apply a torque to each planetary gear assembly according to a clocking arrangement.

5. The planetary gear system of claim 4 wherein, in the clocking arrangement:
   a torquing mechanism of the first planetary gear assembly and a torquing mechanism of the third planetary gear assembly are configured to apply a torque along a first clocking direction on the respective first planetary gear assembly and the third planetary gear assembly; and
   a torquing mechanism of the second planetary gear assembly and a torquing mechanism of the fourth planetary gear assembly are configured to apply a torque along a second clocking direction on the respective second planetary gear assembly and the fourth planetary gear assembly, the second clocking direction opposite to the first clocking direction.

6. The planetary gear system of claim 4 wherein, in the clocking arrangement:
   a torquing mechanism of the first planetary gear assembly and a torquing mechanism of the second planetary gear assembly are configured to apply a torque along a first clocking direction on the respective first planetary gear assembly and the second planetary gear assembly; and
   a torquing mechanism of the third planetary gear assembly and a torquing mechanism of the fourth planetary gear assembly are configured to apply a torque along a second clocking direction on the respective third planetary gear assembly and the fourth planetary gear assembly, the second clocking direction opposite to the first clocking direction.

7. The planetary gear system of claim 2 wherein the output planetary gear comprises at least one tooth configured with a short tooth profile adjustment.

8. The planetary gear system of claim 2 wherein the rotatable ring gear comprises at least one tooth configured with a short tooth profile adjustment.

9. The planetary gear system of claim 2 wherein the sun gear comprises at least one tooth configured with a short tooth profile adjustment.

10. The planetary gear system of claim 1 wherein the first planetary gear comprises at least one tooth configured with a long tooth profile adjustment.

11. The planetary gear system of claim 1 wherein the second planetary gear comprises at least one tooth configured with a long tooth profile adjustment.

12. The planetary gear system of claim 1 wherein the first stationary ring gear comprises at least one tooth configured with a long tooth profile adjustment.

13. The planetary gear system of claim 1 wherein the second stationary ring gear comprises at least one tooth configured with a long tooth profile adjustment.

14. The planetary gear system of claim 1 wherein the torquing mechanism comprises:
   a torsion bar having a first end and a second end, the first end configured to couple with the second planetary gear;
   a torque adaptor coupled to the second end of the torsion bar and coupled to the first planetary gear; and
   a torque adjuster in communication with the torque adaptor, the torque adjuster coupled to the torque adaptor and configured to rotate the first planetary gear relative to the second planetary gear.

15. The planetary gear system of claim 14 wherein:
   the second end of the torsion bar defines a multifaceted end portion; and
   the torque adaptor defines a multifaceted shaped opening configured to engage the multifaceted end portion of the second end of the torsion bar to couple the torque adaptor to the torsion bar.

16. The planetary gear system of claim 14 wherein:
the first end of the torsion bar defines a multifaceted end portion; and
the second planetary gear defines a multifaceted shaped opening configured to engage the multifaceted end portion of the first end of the torsion bar to couple the second planetary gear to the torsion bar.

17. A method for assembling a planetary gear system comprising:
attaching a torquing mechanism to a planetary gear assembly, the planetary gear assembly having a first planetary gear and a second planetary gear, the first planetary gear rotatably coupled to the second planetary gear;
coupling the first planetary gear to a first stationary ring gear;
coupling the second planetary gear to a second stationary ring gear; and
engaging the torquing mechanism to (i) rotate the first planetary gear along a first rotational direction to load the first planetary gear against the first stationary ring gear and (ii) rotate the second planetary gear along a second rotational direction to load the second planetary gear against the second stationary ring gear, the second direction being substantially opposite to the first rotational direction.

18. The method of claim 17, wherein coupling comprises:
coupling an output planetary gear to the second planetary gear;
disposing a sun gear in communication with at least one of the output planetary gear, the first planetary gear, and the second planetary gear;
disposing a rotatable ring gear in communication with the output planetary gear, the rotatable ring gear configured to rotate relative to the first stationary ring gear and the second stationary ring gear; and
wherein the planetary gear assembly comprises a first planetary gear assembly, a second planetary gear assembly, a third planetary gear assembly, and a fourth planetary gear assembly, each gear assembly in communication with and oriented about the sun gear such that the first planetary gear assembly orients substantially opposite to the third planetary gear assembly relative to a long axis defined by the planetary gear system and such that the second planetary gear assembly orients substantially opposite to the fourth planetary gear assembly relative to the long axis defined by the planetary gear system.

19. The method of claim 18, comprising applying, with a torquing mechanism of each planetary gear assembly, a torque to each planetary gear assembly according to a clocking arrangement.

20. The method of claim 19, wherein applying comprises:
applying, with a torquing mechanism of the first planetary gear assembly and a torquing mechanism of the third planetary gear assembly, a torque along a first clocking direction on the respective first planetary gear assembly and the third planetary gear assembly; and
applying, with a torquing mechanism of the second planetary gear assembly and a torquing mechanism of the fourth planetary gear assembly, a torque along a second clocking direction on the respective second planetary gear assembly and the fourth planetary gear assembly, the second clocking direction opposite to the first clocking direction.

21. The method of claim 19, wherein applying comprises:
applying, with a torquing mechanism of the first planetary gear assembly and a torquing mechanism of the second planetary gear assembly, a torque along a first clocking direction on the respective first planetary gear assembly and the second planetary gear assembly; and
applying, with a torquing mechanism of the third planetary gear assembly and a torquing mechanism of the fourth planetary gear assembly a torque along a second clocking direction on the respective third planetary gear assembly and the fourth planetary gear assembly, the second clocking direction opposite to the first clocking direction.

22. The planetary gear system of claim 1, wherein the torquing mechanism is further configured to cause teeth of the first planetary gear to contact teeth of the first stationary ring gear prior to the first planetary gear moving from a resting state to an active state and to cause teeth of the second planetary gear to contact teeth of the second stationary ring gear prior to the second planetary gear moving from a resting state to an active state.

23. The method of claim 17 wherein engaging comprises engaging the torquing mechanism to (i) rotate the first planetary gear along a first rotational direction to load the first planetary gear against the first stationary ring gear to cause teeth of the first planetary gear to contact teeth of the first stationary ring gear prior to the first planetary gear moving from a resting state to an active state and (ii) rotate the second planetary gear along a second rotational direction to load the second planetary gear against the second stationary ring gear to cause teeth of the second planetary gear to contact teeth of the second stationary ring gear prior to the second planetary gear moving from a resting state to an active state, the second direction being substantially opposite to the first rotational direction.

* * * * *

UNITED STATES PATENT AND TRADEMARK OFFICE
CERTIFICATE OF CORRECTION

PATENT NO. : 7,121,973 B1 Page 1 of 1
APPLICATION NO. : 10/839091
DATED : October 17, 2006
INVENTOR(S) : Ted Lumpkin and Tom Wolf It is certified that error appears in the above-identified patent and that said Letters Patent is hereby corrected as shown below:

Title Page

Under the Heading (73) Assignee, "Santa Clara, CA" should read -- Santa Clarita, CA --.

Signed and Sealed this

Second Day of January, 2007

JON W. DUDAS
*Director of the United States Patent and Trademark Office*